United States Patent
Park et al.

(10) Patent No.: US 10,268,908 B2
(45) Date of Patent: *Apr. 23, 2019

(54) SIDE SAFETY ASSISTANT DEVICE AND METHOD FOR LARGE VEHICLE

(71) Applicant: PLK TECHNOLOGIES CO., LTD., Seoul (KR)

(72) Inventors: Kwang Il Park, Seoul (KR); Sang Mook Lim, Seoul (KR); Jin Hyuck Kim, Seoul (KR)

(73) Assignee: PLK TECHNOLOGIES CO., LTD., Seoul (KR)

( * ) Notice: Subject to any disclaimer, the term of this patent is extended or adjusted under 35 U.S.C. 154(b) by 130 days.

This patent is subject to a terminal disclaimer.

(21) Appl. No.: 15/414,924

(22) Filed: Jan. 25, 2017

(65) Prior Publication Data

US 2018/0165527 A1   Jun. 14, 2018

(30) Foreign Application Priority Data

Dec. 12, 2016  (KR) .......................... 10-2016-0168476

(51) Int. Cl.
  *B60R 1/00*    (2006.01)
  *G06K 9/00*    (2006.01)
  (Continued)

(52) U.S. Cl.
  CPC .......... *G06K 9/00805* (2013.01); *B60R 1/00* (2013.01); *G06K 9/4604* (2013.01);
  (Continued)

(58) Field of Classification Search
  CPC ............. G06K 9/00805; G06K 9/6215; G06K 9/6269; G06K 9/4604; G06K 9/4647;
  (Continued)

(56) References Cited

U.S. PATENT DOCUMENTS

| 9,718,405 B1* | 8/2017 | Englander .............. B60Q 9/008 |
| 2013/0300897 A1* | 11/2013 | Kanamoto ........... G06K 9/4647 |
| | | 348/231.99 |
| 2014/0133701 A1* | 5/2014 | Ma ........................ G06T 7/2033 |
| | | 382/103 |

FOREIGN PATENT DOCUMENTS

| JP | 2001-315601 A | 11/2001 |
| JP | 2010-530569 A | 9/2010 |

(Continued)

OTHER PUBLICATIONS

Joko (Moving Object Localization Using Optical Flow for Pedestrian Detection from a Moving Vehicle, Scientific World Journal, Published Jul. 10, 2014).*

(Continued)

*Primary Examiner* — Christopher S Kelley
*Assistant Examiner* — Nasim N Nirjhar
(74) *Attorney, Agent, or Firm* — Rabin & Berdo, P.C.

(57) ABSTRACT

A side safety assistant device for a large vehicle may include: a rear camera module mounted at the rear of at least one side surface of a large vehicle and configured to image an object while facing the front of the large vehicle; a front camera module mounted at the front of at least one side surface of the large vehicle and configured to image an object while facing the rear of the large vehicle; one or more image recognition modules configured to receive an image taken by the rear and front camera modules, extract an object included in the image, determine whether the extracted object is a moving object, determine whether the moving object is located in a preset dangerous zone, and output a collision risk signal; a warning unit configured to output a visual or auditory warning signal; and a control unit configured to operate the warning unit.

21 Claims, 10 Drawing Sheets

(51) Int. Cl.
  *G06K 9/46* (2006.01)
  *G06K 9/62* (2006.01)
  *G06T 7/13* (2017.01)
  *G08G 1/16* (2006.01)
  *H04N 5/77* (2006.01)
  *H04N 7/18* (2006.01)
  *H04W 4/40* (2018.01)
  *H04W 4/80* (2018.01)
  *G06T 7/246* (2017.01)
  *H04N 5/232* (2006.01)
  *H04N 5/247* (2006.01)

(52) U.S. Cl.
  CPC ......... *G06K 9/4647* (2013.01); *G06K 9/4671* (2013.01); *G06K 9/6215* (2013.01); *G06K 9/6269* (2013.01); *G06T 7/13* (2017.01); *G06T 7/248* (2017.01); *G08G 1/166* (2013.01); *G08G 1/167* (2013.01); *H04N 5/23229* (2013.01); *H04N 5/23293* (2013.01); *H04N 5/247* (2013.01); *H04N 5/77* (2013.01); *H04N 7/181* (2013.01); *H04W 4/40* (2018.02); *B60R 2300/303* (2013.01); *B60R 2300/60* (2013.01); *B60R 2300/802* (2013.01); *G06T 2207/10004* (2013.01); *G06T 2207/20021* (2013.01); *G06T 2207/30261* (2013.01); *H04W 4/80* (2018.02)

(58) Field of Classification Search
  CPC .... G08G 1/166; H04N 7/181; H04N 5/23293; H04N 5/907; B60R 1/00; B60R 2300/8093; B60R 2300/802; B60R 11/04; H04W 4/80; G06T 2207/10004; G06T 2207/30261; G06T 2207/20021; G06T 7/13; G06T 7/248
  See application file for complete search history.

(56) References Cited

FOREIGN PATENT DOCUMENTS

| | | |
|---|---|---|
| JP | 2016-051371 A | 4/2016 |
| KR | 10-2013-0026933 A | 3/2013 |
| KR | 10-1569411 B1 | 11/2015 |
| KR | 10-1604447 B1 | 3/2016 |
| KR | 10-2016-0045857 A | 4/2016 |

OTHER PUBLICATIONS

Korean Office Action dated Jun. 28, 2018.

* cited by examiner

SIDE SAFETY ASSISTANT DEVICE AND METHOD FOR LARGE VEHICLE

BACKGROUND

1. Technical Field

The present disclosure relates a safety assistant system and method for a large vehicle, which can identify a moving object such as a bicycle, two-wheeled vehicle or pedestrian located at a side of a large vehicle, using cameras installed at the side of the large vehicle so as to face each other, and warn a driver or emergently brake the vehicle, thereby preventing an accident resulting in an injury or death.

2. Related Art

In general, AVMS (Around View Monitoring System) represents a system which includes a plurality of cameras installed on a vehicle, recognizes an obstacle around the vehicle by recognizing images taken by the cameras, and predicts and warns a collision risk with an obstacle located at the blind spot of a driver. Recently, the AVMS tends to be mounted on expensive luxury cars.

FIG. 1 is a side view illustrating an example in which the AVMS is installed on a large vehicle, exemplifying that cameras facing four directions (front, rear, left and right) are installed on a school bus. As illustrated in FIG. 1, the upper frame of the large vehicle 100 includes a front camera 140, a rear camera 150 and side cameras 160 at both sides thereof. The AVMS displays images taken by the respective cameras to a driver, and identifies a moving object such as a bicycle, two-wheeled vehicle or pedestrian from the taken images through an image recognition module.

However, the large vehicle 100 has a considerably large vehicle height, and the cameras are installed at the upper frame of the vehicle as illustrated in FIG. 1. Thus, the cameras take an image of an object close to the vehicle at an angle from top to bottom. Therefore, since the AVMS has difficulties in recognizing the shape of the object, it is difficult to apply a machine learning technique which trains data to distinguish from a similar shape. Furthermore, since the cameras take an image of an object against light in many cases, it is difficult to distinguish between the object and the shade. Thus, the AVMS may have difficulties in identifying a moving object such as a bicycle, two-wheeled vehicle or pedestrian close to the large vehicle 100.

FIG. 2 is a plan view illustrating an example in which the large vehicle makes a turn at a crossroad. As illustrated in FIG. 2, when a bicycle 200 runs in parallel to the right rear of the large vehicle 100 while the large vehicle 100 tries to make a right turn, the bicycle 200 may not come into the sight of a driver, and the AVMS may have difficulties in identifying the moving object at the side of the large vehicle 100 as described above. Since the large vehicle 100 has a large whole length, the side frame of the large vehicle 100 may come in contact with the bicycle 200 even though the front wheel thereof does not collide with the bicycle 200. Then, the bicycle rider may lose his balance and fall down, and the rear wheel of the large vehicle 100 may pass the fallen bicycle rider on the turn path of the large vehicle 100. In this case, the bicycle rider may be dead or seriously wounded.

Such a type of accident does not frequently occur. However, such a type of accident is highly likely to result in a loss of life due to the characteristic of the large vehicle, even though the large vehicle is operated at low speed. Such a type of accident occurs because the driver of the large vehicle does not identify a bicycle, two-wheeled vehicle or pedestrian which has a smaller size and moves at a lower speed than even the large vehicle which makes a turn along a pedestrian passage while traveling at low speed. As illustrated in FIG. 2, the large vehicle has a dangerous zone 300 formed in a triangle shape where the dangerous zone 300 has a large area at the side front of the vehicle and a small area at the side rear of the vehicle. Furthermore, since such a type of accident exhibits a high death frequency, it is necessary to prevent such a type of accident.

In order to prevent such a type of accident, a conventional safety assistant device for a large vehicle in FIG. 3 includes an SRR (Short Range Rader) 110 which is installed at a side front thereof and monitors a moving object such as a bicycle 200 at the side rear thereof. Referring to FIG. 3, the SRR has a monitoring area 120 that has a short measurement distance but has a wide measurement angle. Thus, the SRR can widen the area for monitoring the side rear of the passenger seat (or driver seat). However, the SSR cannot cover the entire dangerous zone 300 described with reference to FIG. 1. Thus, when the moving object such as the bicycle 200 is located out of the monitoring area 120, the SSR cannot monitor the moving object. Furthermore, a large vehicle such as a trailer has a cargo bed of which the entire part is made of a metallic material. Thus, when the SSR is installed at the side rear of the vehicle, the SSR may have difficulties in detecting a small bicycle due to propagation interference or the like.

Korean Patent Publication No. 10-2016-0045857 has disclosed a technique for detecting an object using a 3D camera and radar. Even the detection method using the 3D camera and radar according to the document has difficulties in detecting a bicycle, two-wheeled vehicle or pedestrian located in a radius of rotation of a large vehicle. Thus, the detection method still has the above-described problems.

RELATED ART DOCUMENT

Patent Document (Patent Document 1) Korean Patent Publication No. 10-2016-0045857

SUMMARY

Various embodiments are directed to a safety assistant system and method for a large vehicle, which includes cameras at the side front and rear of the large vehicle so as to face each other, can detect a moving object such as a bicycle, two-wheeled vehicle or pedestrian at the side of the large vehicle from an image taken by the cameras facing each other, accurately identify the moving object located at the side of the large vehicle through a machine learning technique, and significantly reduce a collision accident with a moving object located in the radius of rotation of the large vehicle which travels makes a turn at low speed.

In an embodiment, a side safety assistant device for a large vehicle may include: a rear camera module mounted at the rear of at least one side surface of a large vehicle and configured to image an object while facing the front of the large vehicle; a front camera module mounted at the front of at least one side surface of the large vehicle so as to face the rear camera module, and configured to image an object while facing the rear of the large vehicle; one or more image recognition modules configured to receive an image taken by the rear and front camera modules, extract an object included in the image, determine whether the extracted object is a moving object including a bicycle, two-wheeled vehicle and pedestrian, determine whether the moving object is located in a preset dangerous zone, and output a collision risk signal; a warning unit configured to output a visual or auditory warning signal to a driver of the large vehicle; and a control unit configured to operate the warning unit when the image recognition module outputs the collision risk signal.

In another embodiment, there is provided a side safety assistant method for a large vehicle, that monitors a dangerous zone at a side of the large vehicle using a rear camera module which is mounted at the rear of at least one side surface of the large vehicle and configured to image an object while facing the front of the large vehicle and a front camera module which is mounted at the front of at least one side surface of the large vehicle so as to face the rear camera module and configured to image an object while facing the rear of the large vehicle. The side safety assistant method may include the steps of: (a) receiving an image from the rear camera module and the front camera module; (b) extracting an object included in the image received at the step (a); (c) determining whether the object extracted at the step (b) is a moving object including a bicycle, two-wheeled vehicle and pedestrian; (d) determining whether the moving object determined at the step (c) is located within a preset dangerous zone, and outputting a collision risk signal; and (e) outputting a visual or auditory warning signal in response to the collision risk signal.

DETAILED DESCRIPTION

Hereafter, exemplary embodiments of the present invention will be described with reference to the accompanying drawings. However, the present invention is not limited to the exemplary embodiments, but may include all modifications, equivalents and substitutions without departing the scope of the present invention.

The present invention relates to a side safety assistant device and method for a large vehicle, which accurately identifies a moving object located at a side of the large vehicle, using cameras installed at the side front and rear of the large vehicle so as to face each other, determines a collision risk with the moving object, and warns a driver of the large vehicle. In the following descriptions, 'large vehicle' indicates a large vehicle such as a cargo truck, trailer, bus or heavy equipment, and 'moving object' indicates a moving object such as a bicycle, two-wheeled vehicle or pedestrian. Furthermore, a cargo truck will be exemplified as the large vehicle, and a bicycle and pedestrian will be exemplified as the moving object.

Figure 1:
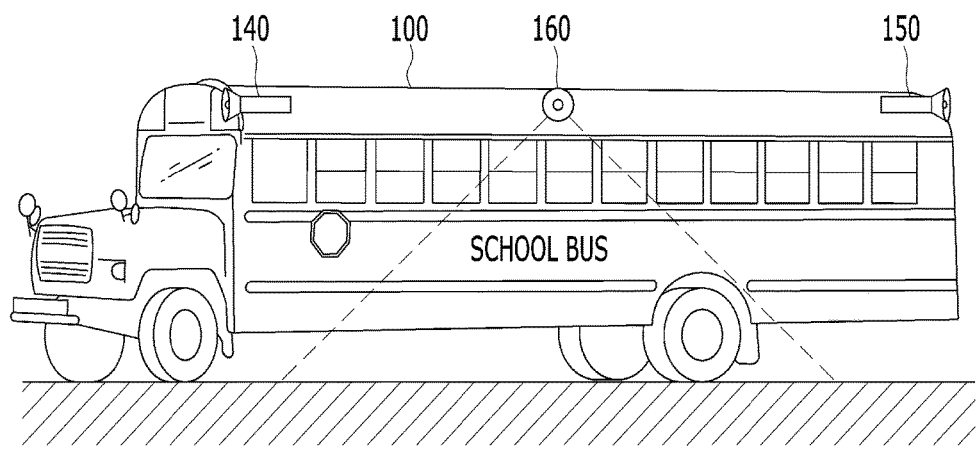
FIG. 1 is a side view illustrating an example in which an AVMS (Around View Monitoring System) is installed on a large vehicle according to the related art.
Figure 2:
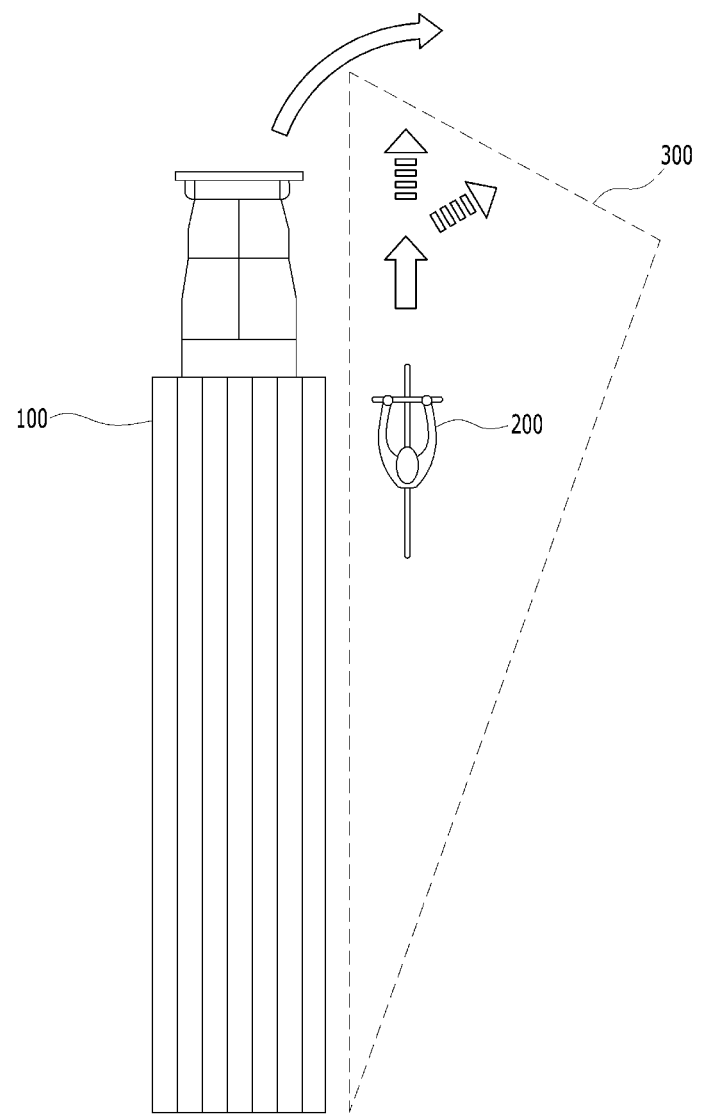
FIG. 2 is a plan view illustrating an example in which the large vehicle makes a turn according to the related art.
Figure 3:
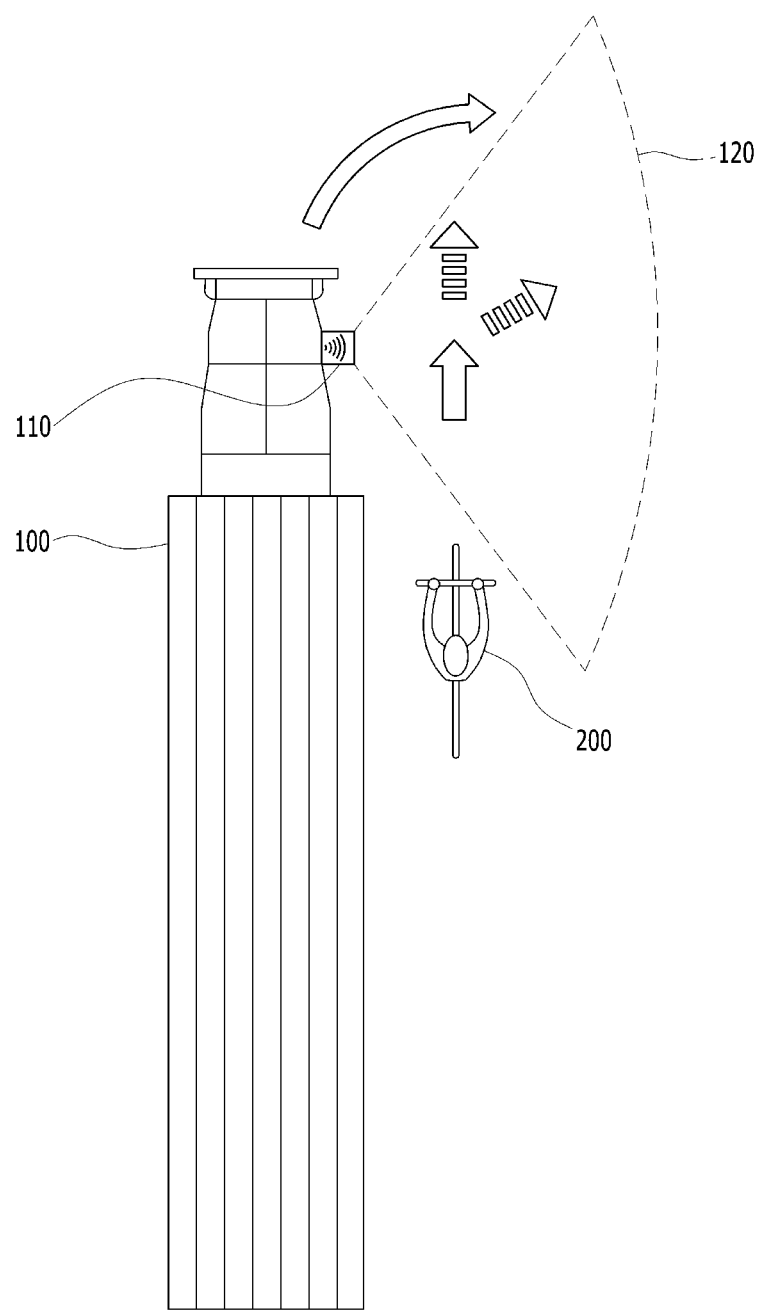
FIG. 3 is a plan view illustrating an example in which an SRR (Short Range Rader) is mounted on the large vehicle according to the related art.
Figure 4:
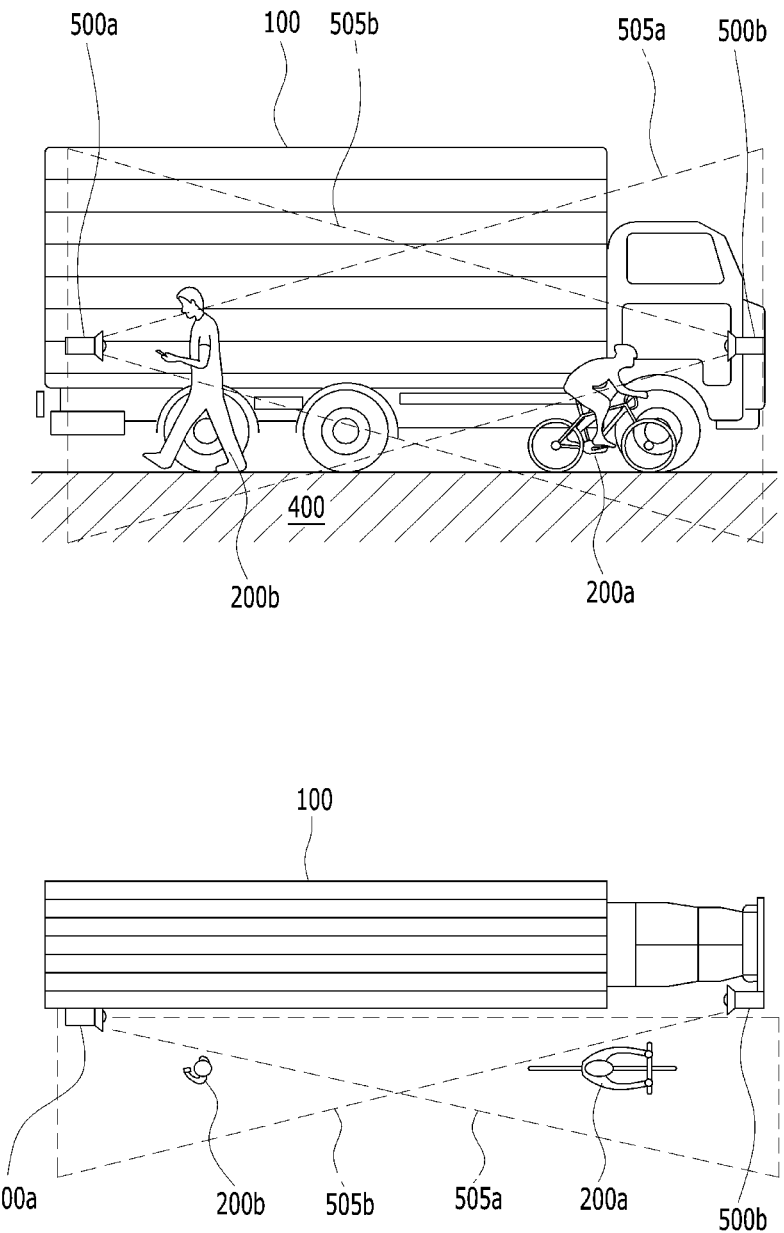
FIG. 4 is a diagram illustrating an example in which cameras facing each other are installed on a large vehicle according to an embodiment of the present invention.

FIG. 4 is a diagram illustrating an example in which cameras facing each other are installed on a large vehicle, and includes a side view of the large vehicle at the top thereof and a plan view of the large vehicle at the bottom thereof.

Referring to FIG. 4, a rear camera module 500a is mounted at the rear of at least one side surface of the large vehicle 100, and a front camera module 500b is mounted at the front of at least one side surface of the large vehicle 100, facing the rear camera module 500a. The rear camera module 500a faces the side front of the large vehicle 100 in order to image an object, and the front camera module 500b faces the side rear of the large vehicle 100 in order to image an object.

The rear camera module 500a and the front camera module 500b have an installation height of 1 m to 1.5 m from the ground surface 400. As indicated by a dotted line in the side view at the top of FIG. 4, the rear camera module 500a has a rear camera module imaging area 505a which gradually widens toward the front of the large vehicle 100. The front camera module 500b has a front camera module imaging area 505b which gradually widens toward the rear of the large vehicle 100.

When a bicycle 200a is located at the side of the passenger seat of the large vehicle 100 as illustrated in FIG. 4, it may be difficult for the front camera module 500b to image the whole figure of the bicycle 200a because only a part of the bicycle 200a is covered by the front camera module imaging area 505b. However, since the rear camera module imaging area 505a covers the whole part of the bicycle 200a, the rear camera module 500a can image the whole figure of the bicycle 200a. Similarly, when a pedestrian 200b is located at the side rear of the large vehicle 100 as illustrated in FIG. 4, the front camera module 500b can image the whole figure of the pedestrian 200b at the side rear of the large vehicle 100.

That is, since the rear camera module 500a and the front camera module 500b have complementary imaging areas at the side surface of the large vehicle 100, the side safety assistant device can monitor the whole side area.

As illustrated in FIG. 4, the rear camera module 500a and the front camera module 500b do not image an object in the direction from top to bottom, but can image an object in the direction from rear to front. Thus, the rear camera module 500a and the front camera module 500b can obtain an image containing the formal characteristics of a moving object. Therefore, the side safety assistant device can recognize an image using a machine learning technique as described later, and thus identify a moving object.

FIG. 4 illustrates an example in which the rear camera module 500a and the front camera module 500b are mounted at the right side of the large vehicle 100, but the camera modules facing each other may be installed at the left side of the large vehicle 100. Under the traffic environment in Korea, the large vehicle 100 makes a right turn along a pedestrian passage while making a left turn at a crossroad. In such a traffic environment, when the large vehicle 100 makes a turn at the left-turn section where the large vehicle 100 travels at a relatively high speed, a moving object is unlikely to be located at the left side of the large vehicle 100. However, when the large vehicle 100 makes a turn at the right-turn section where the large vehicle 100 travels at a low speed, a moving object is likely to be located at the right side of the large vehicle 100 or a pedestrian passage. That is, in order to identify a moving object when the large vehicle 100 makes a right turn in the traffic environment of Korea, the camera modules facing each other may be installed at the right side of the large vehicle 100. In a different traffic environment of other countries, the camera modules facing each other may be installed at the left side of the large vehicle 100. However, the present invention is not limited thereto, but the camera modules facing each other may be installed at either side of the large vehicle 100.

Figure 5:
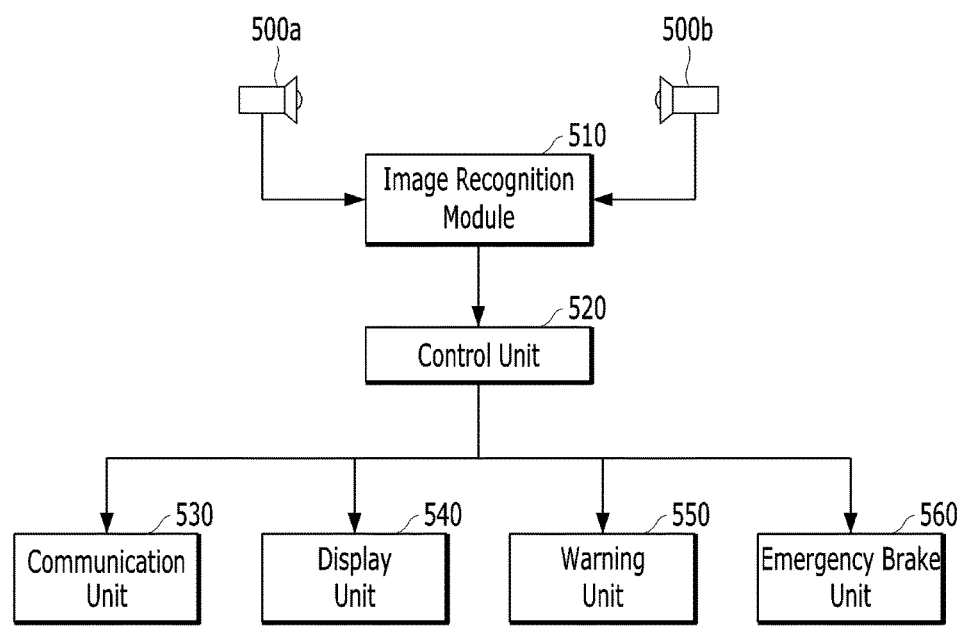
FIG. 5 is a block diagram illustrating a side safety assistant device according to an embodiment of the present invention.
Figure 6:
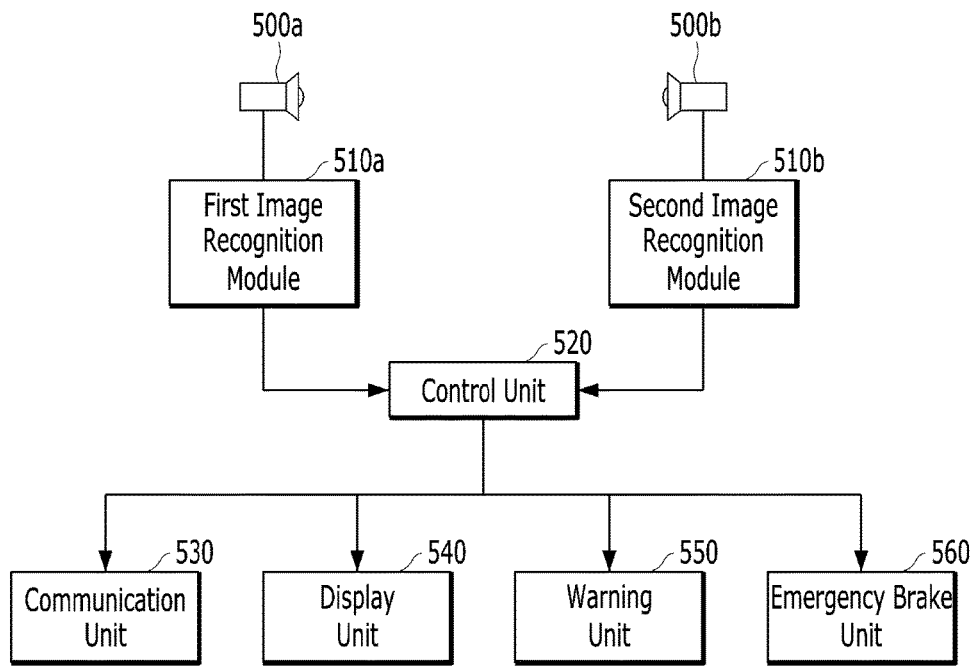
FIG. 6 is a block diagram illustrating a side safety assistant device according to another embodiment of the present invention.

FIGS. 5 and 6 are block diagrams illustrating the side safety assistant device for a large vehicle according to the embodiment of the present invention. FIG. 5 illustrates an example in which a single image recognition module 510 recognizes and processes images of the rear camera module 500a and the front camera module 500b, and FIG. 6 illustrates an example in which image recognition modules 510a and 510b dedicated to the rear and front camera modules 500a and 500b, respectively, are installed.

Referring to FIG. 5, the side safety assistant device for a large vehicle according to the embodiment of the present invention includes the rear camera module 500a, the front camera module 500b, an image recognition module 510, a control unit 520, a communication unit 530, a display unit 540, a warning unit 550 and an emergency brake unit 560. The side safety assistant device may be included in an ADAS (Advanced Driver Assistance System). In this case, the components of the side safety assistant device will implement functions described later with the basic functions of the ADAS. The side safety assistant device according to the embodiment of the present invention may be configured independently of the ADAS, and used as a device for identifying a moving object located at the side of the large vehicle 100 and warning a driver.

The image recognition module 510 receives an image from the rear camera module 500a and the front camera module 500b, extracts an object from the received image, determines whether the extracted object is a moving object including a bicycle, two-wheeled vehicle or pedestrian, checks whether the moving object is located in a preset dangerous zone, and outputs a collision risk signal.

When one image recognition module 510 is used for the camera modules 500a and 500b facing each other as illustrated in FIG. 5, the image recognition module 510 may alternately recognize and process an image inputted from the rear camera module 500a and an image inputted from the front camera module 500b within a predetermined time.

On the other hand, when the first image recognition module 510a is installed for the rear camera module 500a and the second recognition module 510b is installed for the front camera module 500b as illustrated in FIG. 6, the image recognition modules 510a and 510b may dedicatedly recognize and process signals provided from the corresponding camera modules.

The control unit 520 receives an image recognition result from the image recognition module 510, and controls the operations of the communication unit 530, the display unit 540, the warning unit 550 and the emergency brake unit 560. The control unit 520 may include a CPU such as a microprocessor.

The communication unit 530 may be embodied by an NFC (Near Field Communication) module such as Bluetooth or Wi-Fi, a broadband mobile communication module such as CDMA (Code Division Multiple Access) or LTE (Long Term Evolution), or a combination of the NFC module and the broadband mobile communication module. The communication unit 530 may transmit a recognition result of the image recognition module 510 to surrounding communication units through a V2X (Vehicle to Everything) communication system. For example, the communication unit 530 may transmit a collision risk signal with a moving object to an infrastructure unit such as a traffic signal controller through a V2I (Vehicle to Infra) communication network. For another example, the communication unit 530 may transmit a collision risk signal to an adjacent vehicle or a mobile terminal of a pedestrian through a V2V (Vehicle to Vehicle) or V2P (Vehicle to Pedestrian) communication network. As such, the communication unit 530 can transmit a collision risk signal and information to the surrounding devices through the V2X communication system, the information indicating whether a moving object is present at the side of the large vehicle, and thus prevent an expansion in loss of lives.

The display unit 540 installed in the vehicle may include an LCD (Liquid Crystal Display), OLED (Organic Light Emitting Diode), AMOLED (Active Matrix Organic Light Emitting Diode), LED array or the like. The display unit 540 outputs an image taken by the rear and front camera modules 500a and 500b and an output result of the image recognition module 510 on the screen. For example, the display unit 540 can overlay a collision risk with a moving object as graphics on the image taken by the rear and front camera modules 500a and 500b, and thus display the side image of the large vehicle 100 and the collision risk with the moving object.

The warning unit 550 outputs a visual or auditory warning signal to a driver of the large vehicle 100. For example, the warning unit 550 may display the presence of the moving object as graphics on the display screen seen by the driver or flicker a separate warning LED, thereby notifying the collision risk with the moving object. For another example, the warning unit 550 may output a voice message through a speaker, the voice message saying the presence of the moving object. For another example, the warning unit 550 may warn the driver by turning on a warning light or ringing a buzzer.

The image recognition module 510 may generate two-stage collision risk signals. Specifically, the image recognition module 510 may output a first collision risk signal when a moving object is located in the dangerous zone, and output a second collision risk signal when a change in steering angle of the steering wheel in the large vehicle 100 is sensed while the first collision risk signal is outputted.

When the first collision risk signal is generated, the control unit 520 may operate the visual warning unit of the warning unit 550, and notify that a moving object such as the bicycle 200a or pedestrian 200b is present around the vehicle. For example, the control unit 520 may indicate the collision risk state by flickering the LED or displaying a bicycle as graphics on the display screen of the display unit 540, in order to call the attention of the driver.

When the second collision risk signal is generated, the control unit 520 may operate the auditory warning unit of the warning unit 550, and more actively notify the collision risk. For example, the control unit 520 can output a voice message through the speaker, the voice message indicating that the bicycle 200a is located in the radius of rotation or saying "likely to collide with bicycle", and notify the emergency state by ringing a buzzer.

Furthermore, when the second collision risk signal is generated, the control unit 520 may operate the emergency brake unit 560 to emergently brake the vehicle. The emergency brake unit 560 can autonomously and emergently brake the vehicle without an operation of the driver. The control unit 520 may emergently stop the vehicle immediately in response to the second collision risk signal or operate the emergency brake unit 560 by detecting that the driver is not operating the brake even after the second collision risk signal. Thus, even when the driver does not recognize the collision risk signal, the control unit 520 can forcibly stop the vehicle to prevent a collision with the moving object.

Figure 7:
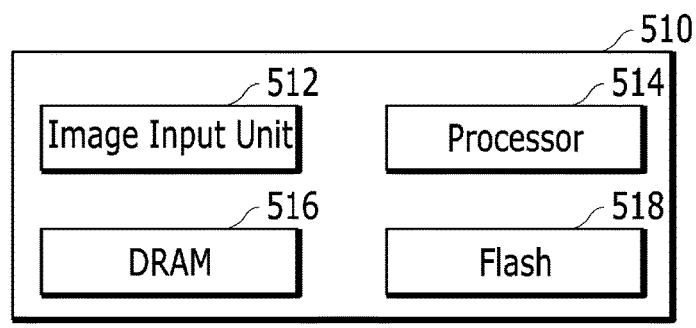
FIG. 7 is a block diagram illustrating the configuration of an image recognition module according to the embodiment of the present invention.

FIG. 7 is a block diagram illustrating the configuration of the image recognition module according to the embodiment of the present invention. Referring to FIG. 7, the image recognition module 510 (or the first and second image recognition modules 510a and 510b) includes an image input unit 512, a processor 514, a volatile memory unit 516 and a nonvolatile memory unit 518.

The image input unit 512 receives an image taken by the rear and front camera modules 500a and 500b.

The processor 514 divides the input image into frames by properly processing the input image, and stores the image frames in the volatile memory unit 516. The processor 514 processes logic for extracting an object from each of the image frames, determining whether the extracted object is a moving object, and determining whether the moving object is located in a dangerous zone. The logic processed by the processor 514 will be described in detail with reference to FIG. 8.

The volatile memory unit 516 is a temporal memory that retains information stored therein only when electricity is supplied, and may include DRAM (Dynamic Random Access Memory), for example. The volatile memory unit 516 may be replaced with another volatile memory such as SRAM (Static Random Access Memory). The volatile memory unit 516 stores an image inputted through the image input unit 512 and intermediate calculation data processed by the processor 514.

The nonvolatile memory unit 518 is a memory that retains information stored therein even though power supply is cut off, and may include Flash Memory, EEPROM (Electrically Erasable Programmable Read-Only Memory), FeRAM (Ferroelectric Random Access Memory), MRAM (Magnetic Random Access Memory), PCRAM (Phase-Change Random Access Memory) and the like. The nonvolatile memory unit 518 stores an image recognition parameter obtained through the logic performed by the processor 514.

Figure 8:
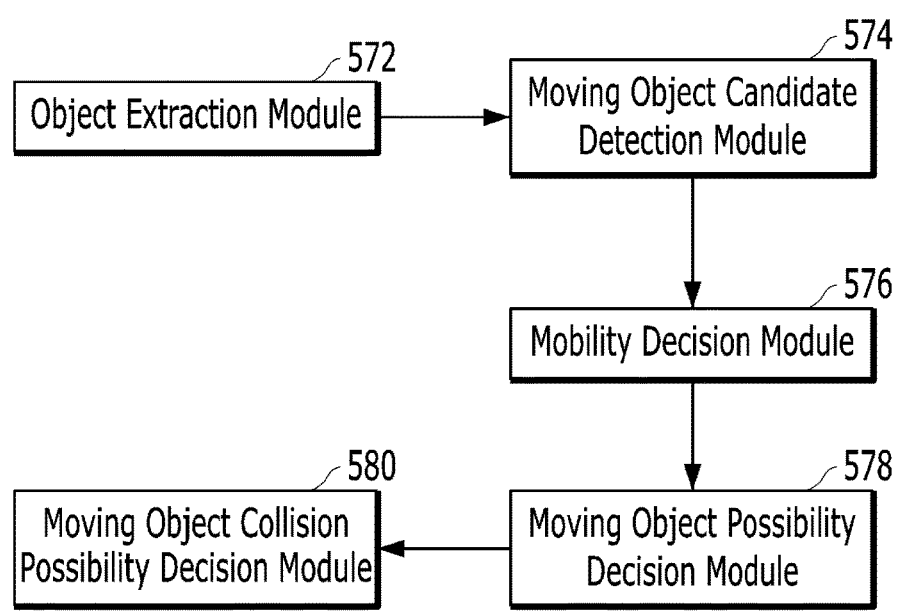
FIG. 8 is a block diagram illustrating the logic configuration of the image recognition module according to the embodiment of the present invention.

FIG. 8 is a block diagram illustrating the logic configuration of the image recognition module according to the embodiment of the present invention. Referring to FIG. 8, the logic processed by the processor 514 of the image recognition module 510 includes an object extraction module 572, a moving object candidate detection module 574, a mobility decision module 576, a moving object possibility decision module 578 and a moving object collision possibility decision module 580.

The object extraction module 572 extracts one or more objects from an input image. Here, 'object' includes moving objects and stationary objects which are present in an image frame. The moving objects may include a bicycle, two-wheeled vehicle and pedestrian, and the stationary objects may include a tree, entry prevention bollard and traffic light. The object extraction module 572 may detect edges within an image frame or extract an object based on a color difference between the object and the background. For example, the object extraction module 572 can calculate the values of the pixels within the image frame, group pixels having a similar pixel value, and extract the grouped pixels as one object.

During the object extraction process of the object extraction module 572, the Canny edge detection algorithm, the line edge detection algorithm, the Laplacian edge detection algorithm or the like may be used. The object extraction module 572 may detect boundary lines using such an algorithm, group areas distinguished from the background based on the boundary lines, and extract the grouped area as an object.

The moving object candidate detection module 574 detects the edge of the object extracted by the object extraction module 572, and detects an object having a predetermined size or more of area distinguished by the edge as a moving object candidate. At this time, the moving object candidate detection module 574 may extract a feature corresponding to a specific feature of a moving object from the object, compare the extracted feature to a previously stored pattern of the moving object, and remove an object irrelevant to the moving object (for example, stationary object) in advance.

For example, the moving object candidate detection module 574 may store the wheel shape of a bicycle 200a and the figure of a bicycle rider as patterns, and determine a similarity between the object extracted by the object extraction module 572 and the pattern of the bicycle 200a, in order to extract a moving object candidate. For another example, when the extracted object is similar to the previously stored pattern of the pedestrian 200b, the moving object candidate detection module 574 may detect the object as a moving object candidate. At this time, the pattern of the pedestrian 200b may be defined as follows. Based on the horizontal line at a point of a vertical component, from which the vertical component is divided into two parts, the upper side of the horizontal line is defined as an upper end portion, and the lower side of the horizontal line is defined as a lower end portion. The length of the upper end portion falls within the range of 60% to 140% for the length of the lower end portion, and the lower end portion is divided into two parts from the horizontal line.

The mobility decision module 576 compares a current frame of the image taken by the rear or front camera module 500a or 500b to a previous frame before the current frame, and detects a motion of the moving object candidate. When the motion is detected, the mobility decision module 576 determines that the moving object candidate is moving.

Specifically, the mobility decision module 576 divides the current frame and the previous frame into predetermined size of blocks, and calculates the sums of pixel value differences between blocks including the moving object candidate in the current frame and blocks including the moving object candidate in the previous frame, based on Equation 1. The mobility decision module 576 sets the block having the smallest sum of pixel value differences to the corresponding block of the previous frame. When the location of the corresponding block is changed, the mobility decision module 576 determines that the moving object candidate is moving.

$$SAD = \sum_{i=1}^{N} \sum_{j=1}^{M} |(I_{ij}(k) - I_{ij}(k-1))| \quad \text{(Equation 1)}$$

In Equation 1, $I_{ij}(k)$ represents the pixel value of an i-th row and j-th column of a block in a k-th image frame, and $I_{ij}(k-1)$ represents the pixel value of an i-th row and j-th column of a block in the immediately previous image frame of the k-th image frame.

The mobility decision module 576 calculates an SAD between blocks at the initial corresponding locations, and then calculates an SAD while changing the locations of a specific block of the k-th image frame and a specific block of the (k−1)th image frame, the specific block indicating a block or blocks including the moving object candidate. Furthermore, the mobility decision module 576 may set the block or blocks having the smallest SAD in the (k−1)th image frame to a block or blocks corresponding to the specific block of the k-th image frame.

After the corresponding block of the (k−1)th image frame is decided, the mobility decision module 576 determines a motion of the moving object candidate, based on whether the location of the corresponding block of the (k−1)th image frame was changed with respect to the location of the specific block in the k-th image frame. The previous image frame is not limited to the (k−1)th frame, but a (k−10)th image frame earlier by ten frames may be used as the previous image frame.

When the mobility decision module 576 determines that the moving object candidate is moving, the moving object possibility decision module 578 performs an HOG (Histogram of Oriented Gradient) operation on the moving object candidate, and performs an SVM (Support Vector Machine) weight operation on the HOG operation result. When the value calculated through the SVM weight operation is equal to or more than a preset threshold value, the moving object possibility decision module 578 sets the moving object candidate to a moving object.

The HOG operation represents the directions of edges as histograms, and may be used when the shape of an object is not significantly changed, an internal pattern is simple, and an object can be identified by the contour line of the object.

For example, the moving object possibility decision module 578 performs the HOG operation on a cell basis having a unit size of (8 pixels 8 pixels), and calculates the directions of edges. Then, the moving object possibility decision module 578 standardizes the directions of the edges to eight angles in the cell, and expresses the respective directions as histograms. The moving object possibility decision module 578 normalizes blocks in which a plurality of cells are combined, and lists the normalized values to calculate a descriptor vector. The normalizing indicates a process of quantifying the directions of edges in each cell into an average value for the blocks. Then, the moving object possibility decision module 578 performs an SVM weight operation on the calculated descriptor vector. When the value calculated through the SVM weight operation is equal to or more than the preset threshold value, the moving object possibility decision module 578 sets the moving object candidate to a moving object. Since the process of performing the SVM weight operation is obvious to those skilled in the art, the detailed descriptions thereof are omitted herein.

The moving object collision possibility decision module 580 determines whether the moving object decided by the moving object possibility decision module 578 is located in the preset dangerous zone, and outputs a collision risk signal according to the determination result.

Figure 9:
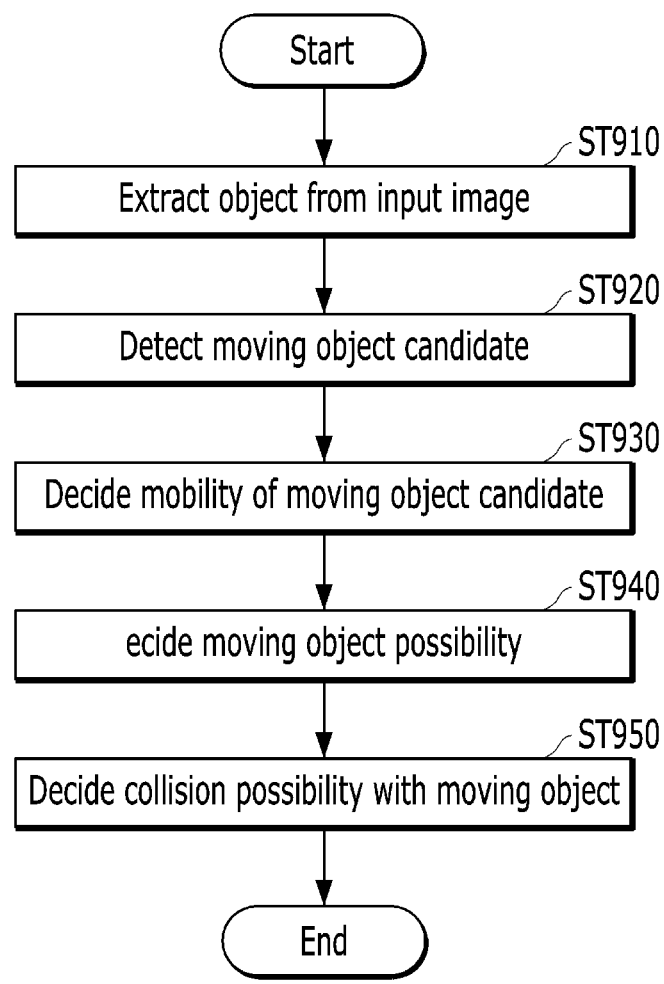
FIG. 9 is a flowchart exemplifying a side safety assistant method according to an embodiment of the present invention.

FIG. 9 is a flowchart exemplifying a side safety assistant method according to an embodiment of the present invention. Referring to FIG. 9, the side safety assistant method starts with step ST910 of extracting an object from an image inputted through the image input unit 512. As described above, a moving object and a stationary object are extracted from each of the received image frames.

Then, the moving object candidate detection module 574 detects a moving object candidate from the extracted objects at step ST920.

When the moving object candidate is detected, the mobility decision module 576 determines the similarities between the moving object candidate and the predefined patterns of the bicycle, two-wheeled vehicle and pedestrian, respectively, and decides the mobility of the moving object candidate, at step ST930. The moving object possibility decision module 578 performs an HOG operation and SVM weight operation on the moving object candidate which is determined to be moving, and finally decides the moving object, at step ST940.

Then, the moving object collision possibility decision module 580 decides a collision possibility with the moving object at step ST950. The process of deciding the collision possibility with the moving object and operating the warning unit 550 or the emergency brake unit 560 will be described later with reference to FIGS. 10 to 12.

Figure 10:
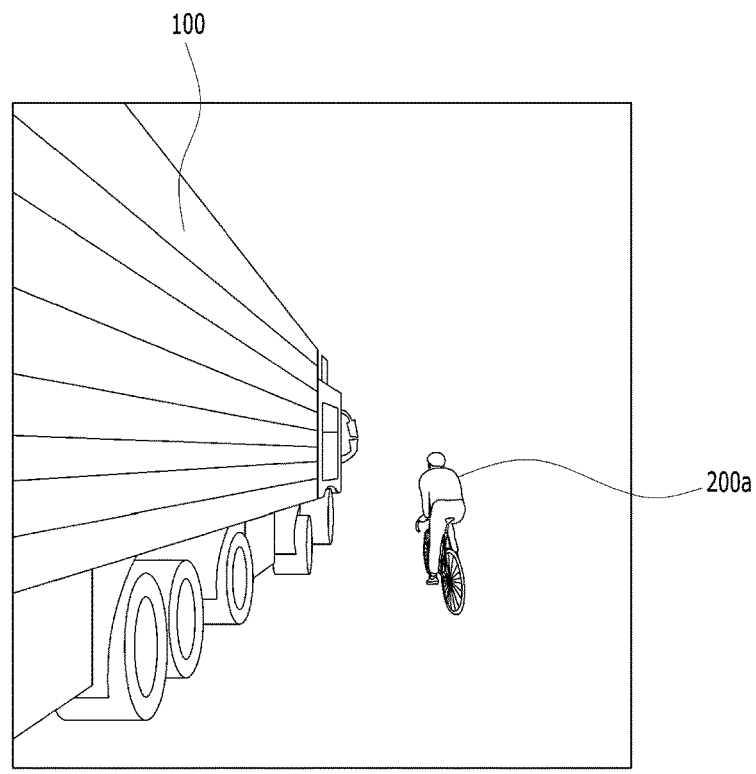
FIG. 10 is a diagram exemplifying an image taken by a rear camera module according to the embodiment of the present invention.

FIG. 10 is a diagram exemplifying an image taken by the rear camera module according to the embodiment of the present invention. In the following descriptions, the bicycle 200*a* imaged by the rear camera module 500*a* will be exemplified to describe a process of deciding a collision possibility with a moving object and generating a collision risk signal. Furthermore, a process of imaging a moving object through the front camera module 500*b*, deciding a collision possibility with the moving object, and generating a collision risk signal may be performed in the same manner as described later.

As described with reference to FIG. 4, the rear camera module 500*a* is mounted at the side rear of the large vehicle 100 and images an object while facing the front. Thus, the side figure of the large vehicle 100 is always displayed at the left side of a viewport illustrated in FIG. 10. Due to a perspective, the size of an object formed in the viewport may decrease toward the front of the vehicle. If the bicycle 200*a* is located adjacent to the right side of the large vehicle 100, an image of the bicycle 200*a* will be displayed at the right side of the large vehicle 100 as illustrated in FIG. 10.

Figure 11:
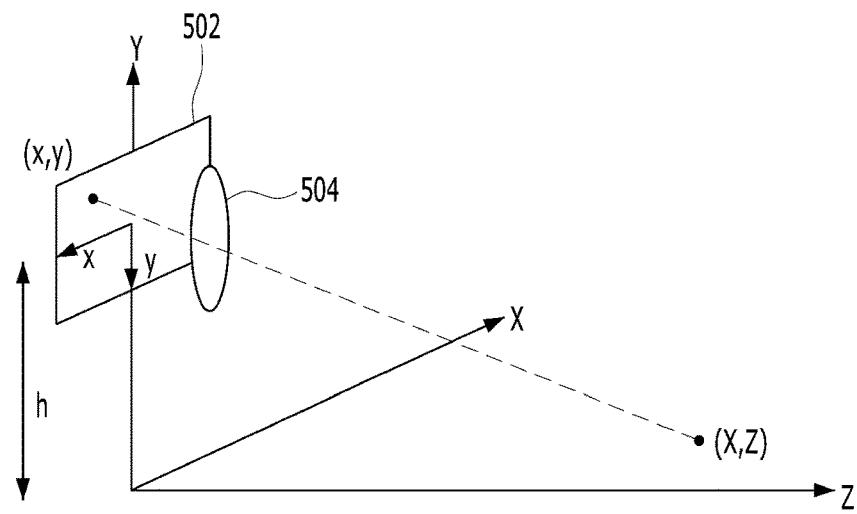
FIG. 11 is a diagram exemplifying the correlation between an actual coordinate system and a camera viewport coordinate system.

FIG. 11 is a diagram illustrating the correlation between an actual coordinate system and a camera viewport coordinate system. As illustrated in FIG. 11, an actual coordinate point (X, Z) on the road may be refracted by a lens 504 and projected as a point (x, y) on a camera viewport 502 detected by a camera sensor.

If the recognized coordinate point (X, Z) indicates the bottom point of the contour line of the moving object, a distance between the recognized coordinate point (X, Z) and the rear camera module 500a on the road may be calculated as Equation 2 below.

$$Z = \frac{fh}{y} \quad \text{(Equation 2)}$$

In Equation 2, Z represents a longitudinal distance between the rear camera module and the moving object on the road, f represents the focal distance of the rear camera module, h represents the height of the rear camera module from the ground surface, and y represents a distance between the bottom point of the contour line of the moving object and a vanishing point on the viewport imaged by the rear camera module.

The X-axis distance of the coordinate point (X, Z) may be decided by Equation 3 below.

$$X = \frac{fx}{y} \quad \text{(Equation 3)}$$

In Equation 3, X represents a horizontal distance between the rear camera module and the moving object on the road, and x represents a distance between the bottom point of the contour line of the moving object and the vanishing point on the viewport imaged by the rear camera module.

Figure 12:
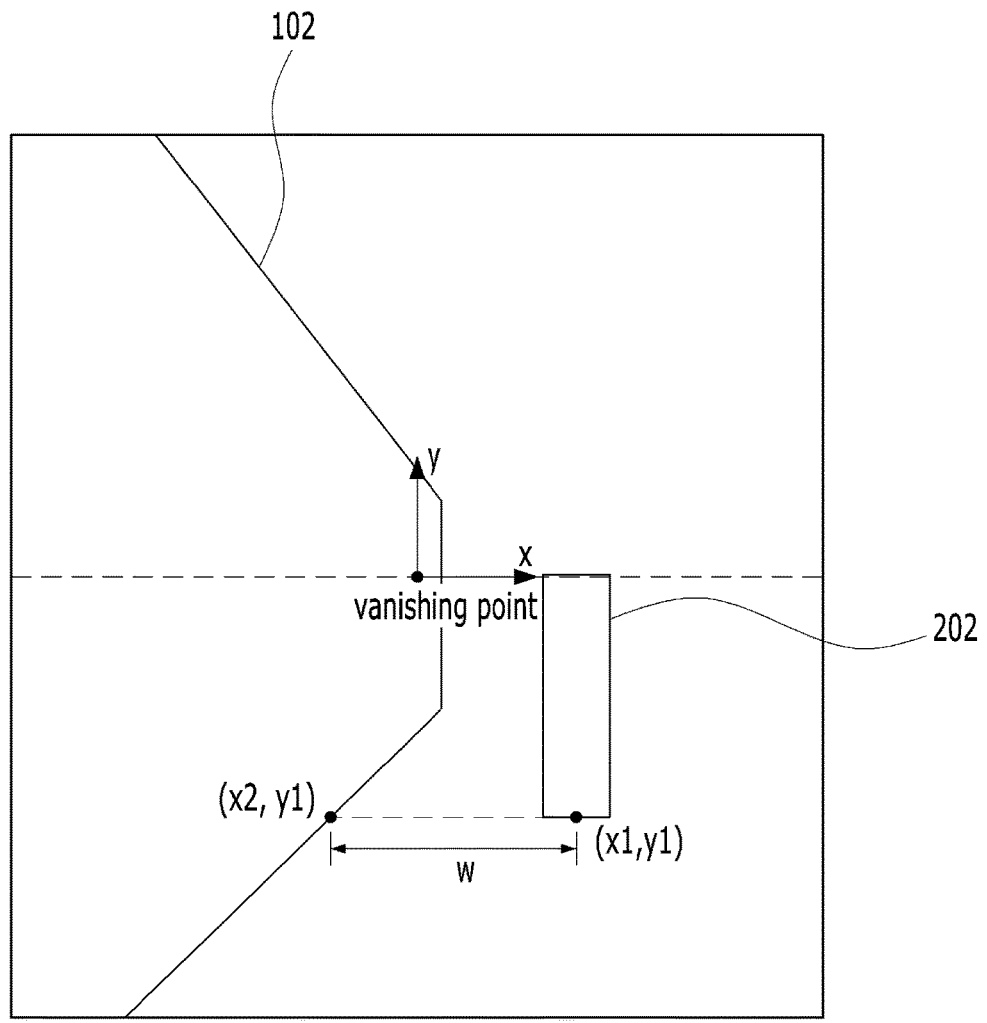
FIG. 12 is a diagram illustrating a process of determining a collision possibility with a bicycle based on the image of FIG. 10.

FIG. 12 is a diagram illustrating the process of determining a collision possibility with the bicycle based on the image of FIG. 10. Referring to FIG. 12, a large vehicle contour line 102 and a bicycle contour line 202 may be obtained from the forward image illustrated in FIG. 10. In FIG. 12, the origin point on the imaged screen represents a vanishing point. Based on the vanishing point, the bottom point of the bicycle contour line has coordinates (x1, y1), and a contour point of the large vehicle, extended horizontally from the bottom of the bicycle contour line has coordinates (x2, y1).

That is, the distance between the large vehicle 100 and the bicycle 200a can be recognized. When the actual distance between the large vehicle 100 and the bicycle 200a is represented by 'W', the actual distance may be calculated through Equation 4 below.

$$W = \frac{fw}{y} \quad \text{(Equation 4)}$$

In Equation 4, W represents a horizontal distance between the large vehicle and the moving object on the road, and w represents a horizontal distance between the contour point of the large vehicle and the bottom point of the contour line of the moving object on the viewport imaged by the rear camera module.

When the longitudinal distance Z between the rear camera module and the moving object on the road, calculated through Equation 2, is positioned between a predefined minimum dangerous distance and a predefined maximum dangerous distance in the longitudinal direction, the moving object collision possibility decision module 580 may output the first collision risk signal. For another example, when the horizontal distance W between the large vehicle and the moving object on the road, calculated through Equation 4, is less than a predefined horizontal dangerous distance, the moving object collision possibility decision module 580 may output the first collision risk signal.

Desirably, when the above-described two conditions are all satisfied, the moving object collision possibility decision module 580 outputs the first collision risk signal. When a change in steering angle of the steering angle in the large vehicle is sensed within a predetermined time after the first collision risk signal is generated, the moving object collision possibility decision module 580 may output the second collision risk signal.

As described above, when the first collision risk signal is generated, the control unit 520 may operate the visual warning unit of the warning unit 550 to warn the driver that the moving object such as the bicycle 200a is present around the vehicle, or overlay and display the collision risk with the moving object as graphics on the taken image through the display unit, in order to notify the collision risk on the display screen. Furthermore, when the second risk collision signal is generated, the control unit 520 may output an active warning signal through the warning unit such as a warning light or generate an auditory warning signal through a speaker or buzzer. Furthermore, when the second collision risk signal is generated, a fatal situation such as death may be caused even by a collision accident at low speed. Thus, although the driver does not operate the brake, the control unit 520 can operate the emergency brake unit 560 to emergently brake the vehicle, thereby preventing an accident resulting in an injury or death.

According to the embodiments of the present invention, the safety assistant system and method for a large vehicle can accurately identify a moving object such as a bicycle, two-wheeled vehicle or pedestrian in the whole side range of the large vehicle. In particular, when the moving object located in the radius of rotation of the large vehicle is located in the dangerous zone, the safety assistant system and method can warn a driver or emergently brake the vehicle, thereby preventing an accident resulting in an injury or death, which occurs at the rear of the large vehicle.

While various embodiments have been described above, it will be understood to those skilled in the art that the embodiments described are by way of example only. Accordingly, the disclosure described herein should not be limited based on the described embodiments.

What is claimed is:

1. A side safety assistant device for a large vehicle, comprising:
    a rear camera module mounted at the rear of at least one side surface of a large vehicle and configured to image an object while facing the front of the large vehicle;
    a front camera module mounted at the front of at least one side surface of the large vehicle so as to face the rear camera module, and configured to image an object while facing the rear of the large vehicle;
    one or more image recognition modules configured to receive an image taken by the rear and front camera modules, extract an object included in the image, determine whether the extracted object is a moving object including a bicycle, two-wheeled vehicle and pedestrian, determine whether the moving object is located in a preset dangerous zone, and output a collision risk signal;
    a warning unit configured to output a visual or auditory warning signal to a driver of the large vehicle; and
    a control unit configured to operate the warning unit when the image recognition module outputs the collision risk signal, wherein the image recognition module comprises:
an image input unit configured to receive an image from the rear camera module and the front camera module;
a processor configured to process logic for extracting an object from the image received from the image input unit, determining whether the extracted object is the moving object, and determining whether the moving object is located in the dangerous zone;
a volatile memory unit configured to store the image received from the image input unit and intermediate calculation data processed by the processor; and
a nonvolatile memory unit configured to store an image recognition parameter obtained through the logic processed by the processor,
wherein the logic processed by the processor comprises:
an object extraction module configured to extract one or more object from the image received from the image input unit;
a moving object candidate detection module configured to detect an edge of the object extracted by the object extraction module and detect an object having a predetermined size or more of area distinguished by the edge as a moving object candidate;
a mobility decision module configured to detect a motion of the moving object candidate by comparing a current frame of the image to a previous frame before the current frame, and determine that the moving object candidate is moving, when the motion is detected;
a moving object possibility decision module configured to perform a HOG (Histogram of Oriented Gradient) operation on the moving object candidate when the mobility decision module determines that the moving object candidate is moving, perform an SVM (Support Vector Machine) weight operation on the HOG operation result, and set the moving object candidate to a moving object when the value calculated through the SVM weight operation is equal to or more than a preset threshold value; and
a moving object collision possibility decision module configured to determine whether the moving object is located in the preset dangerous zone, and output the collision risk signal, and
wherein the mobility object collision possibility decision module recognizes a bottom point of the contour line of the moving object, calculates a longitudinal distance between the rear or front camera module and the moving object on the road based on Equation 2 below, and outputs the collision risk signal when the longitudinal distance falls between a predefined minimum dangerous distance and maximum dangerous distance in the longitudinal direction, $$Z = \frac{fh}{y} \quad \text{(Equation 2)}$$

where Z represents the longitudinal distance between the rear or front camera module and the moving object on the road, f represents the focal distance of the rear or front camera module, h represents the height of the rear or front camera module from the ground surface, and y represents a distance between a vanishing point and the bottom point of the contour line of the moving object on a viewport imaged by the rear or front camera module.

2. The side safety assistant device of claim 1, wherein the image recognition module alternately recognizes and processes an image inputted from the rear camera module and an image inputted from the front camera module within a predetermined processing time.

3. The side safety assistant device of claim 1, wherein the image recognition module comprises:
a first image recognition module configured to receive an image from the rear camera module and output the collision risk signal; and
a second image recognition module configured to receive an image from the front camera module and output the collision risk signal, and
the control unit operates the warning unit when the collision risk signal is outputted from the first or second image recognition module.

4. The side safety assistant device of claim 1, wherein the image recognition module outputs a first risk collision signal when the moving object is located in the dangerous zone, and outputs a second risk collision signal when a change in steering angle of the steering wheel in the large vehicle is sensed while the first collision risk signal is outputted.

5. The side safety assistant device of claim 4, wherein the control unit operates a visual warning unit of the warning unit in response to the first collision risk signal, and operates an auditory warning unit of the warning unit in response to the second collision risk signal.

6. The side safety assistant device of claim 4, further comprising an emergency brake unit configured to emergently brake the large vehicle,
wherein the control unit operates the emergency brake unit in response to the second collision risk signal.

7. The side safety assistant device of claim 1, further comprising a display unit configured to output the output result of the image recognition module and the image taken by the rear and front camera modules on the screen.

8. The side safety assistant device of claim 1, further comprising a communication unit configured to transmit the collision risk signal outputted from the image recognition module through NFC (Near Field Communication) or long-range radio communication.

9. The side safety assistant device of claim 1, wherein the moving object candidate detection module detects a vertical component of the edge of the object, and determines a similarity between the vertical component and a predefined pattern of the moving object, in order to detect the moving object candidate.

10. The side safety assistant device of claim 1, wherein the mobility decision module divides the current frame and the previous frame into a predetermined size of blocks, calculates the sums of pixel value differences between blocks including the moving object candidate in the current frame and blocks including the moving object candidate in the previous frame based on Equation 1 below, sets the block having the smallest sum of pixel value differences to a corresponding block of the previous frame, and determines that the moving object candidate is moving when the location of the corresponding block is changed, $$SAD = \sum_{i=1}^{N}\sum_{j=1}^{M}|(I_{ij}(k) - I_{ij}(k-1))| \quad \text{(Equation 1)}$$

where $I_{ij}(k)$ represents the pixel value of an i-th row and j-th column of a block in a k-th image frame, and $I_{ij}(k-1)$ represents the pixel value of an i-th row and j-th column of a block in the immediately previous image frame of the k-th image frame.

11. A side safety assistant device for a large vehicle, comprising:
a rear camera module mounted at the rear of at least one side surface of a large vehicle and configured to image an object while facing the front of the large vehicle;
a front camera module mounted at the front of at least one side surface of the large vehicle so as to face the rear camera module, and configured to image an object while facing the rear of the large vehicle;
one or more image recognition modules configured to receive an image taken by the rear and front camera modules, extract an object included in the image, determine whether the extracted object is a moving object including a bicycle, two-wheeled vehicle and pedestrian, determine whether the moving object is located in a preset dangerous zone, and output a collision risk signal;
a warning unit configured to output a visual or auditory warning signal to a driver of the large vehicle; and
a control unit configured to operate the warning unit when the image recognition module outputs the collision risk signal,
wherein the image recognition module comprises:
an image input unit configured to receive an image from the rear camera module and the front camera module;
a processor configured to process logic for extracting an object from the image received from the image input unit, determining whether the extracted object is the moving object, and determining whether the moving object is located in the dangerous zone;
a volatile memory unit configured to store the image received from the image input unit and intermediate calculation data processed by the processor; and
a nonvolatile memory unit configured to store an image recognition parameter obtained through the logic processed by the processor,
wherein the logic processed by the processor comprises:
an object extraction module configured to extract one or more object from the image received from the image input unit;
a moving object candidate detection module configured to detect an edge of the object extracted by the object extraction module and detect an object having a predetermined size or more of area distinguished by the edge as a moving object candidate;
a mobility decision module configured to detect a motion of the moving object candidate by comparing a current frame of the image to a previous frame before the current frame, and determine that the moving object candidate is moving, when the motion is detected;
a moving object possibility decision module configured to perform a HOG (Histogram of Oriented Gradient) operation on the moving object candidate when the mobility decision module determines that the moving object candidate is moving, perform an SVM (Support Vector Machine) weight operation on the HOG operation result, and set the moving object candidate to a moving object when the value calculated through the SVM weight operation is equal to or more than a preset threshold value; and a moving object collision possibility decision module configured to determine whether the moving object is located in the preset dangerous zone, and output the collision risk signal, and
wherein the moving object collision possibility decision module recognizes a contour point of the large vehicle and a bottom point of the contour line of the moving object, calculates a horizontal distance between the large vehicle and the moving object on the road based on Equation 4 below, and outputs the collision risk signal when the horizontal distance is less than a predefined horizontal dangerous distance, $$W = \frac{fw}{y} \quad \text{(Equation 4)}$$

where W represents the horizontal distance between the large vehicle and the moving object on the road, f represents the focal distance of the rear or front camera module, w represents a horizontal distance between the contour point of the large vehicle and the bottom point of the contour line of the moving object on a viewport imaged by the rear or front camera module, and y represents a distance between a vanishing point and the bottom point of the contour line of the moving object on the viewport imaged by the rear or front camera module.

12. A side safety assistant device for a large vehicle, comprising:
a rear camera module mounted at the rear of at least one side surface of a large vehicle and configured to image an object while facing the front of the large vehicle;
a front camera module mounted at the front of at least one side surface of the large vehicle so as to face the rear camera module, and configured to image an object while facing the rear of the large vehicle;
one or more image recognition modules configured to receive an image taken by the rear and front camera modules, extract an object included in the image, determine whether the extracted object is a moving object including a bicycle, two-wheeled vehicle and pedestrian, determine whether the moving object is located in a preset dangerous zone, and output a collision risk signal;
a warning unit configured to output a visual or auditory warning signal to a driver of the large vehicle; and
a control unit configured to operate the warning unit when the image recognition module outputs the collision risk signal,
wherein the image recognition module comprises:
an image input unit configured to receive an image from the rear camera module and the front camera module;
a processor configured to process logic for extracting an object from the image received from the image input unit, determining whether the extracted object is the moving object, and determining whether the moving object is located in the dangerous zone;
a volatile memory unit configured to store the image received from the image input unit and intermediate calculation data processed by the processor; and
a nonvolatile memory unit configured to store an image recognition parameter obtained through the logic processed by the processor, wherein the logic processed by the processor comprises:
an object extraction module configured to extract one or more object from the image received from the image input unit;
a moving object candidate detection module configured to detect an edge of the object extracted by the object extraction module and detect an object having a predetermined size or more of area distinguished by the edge as a moving object candidate;
a mobility decision module configured to detect a motion of the moving object candidate by comparing a current frame of the image to a previous frame before the current frame, and determine that the moving object candidate is moving, when the motion is detected;
a moving object possibility decision module configured to perform a HOG (Histogram of Oriented Gradient) operation on the moving object candidate when the mobility decision module determines that the moving object candidate is moving, perform an SVM (Support Vector Machine) weight operation on the HOG operation result, and set the moving object candidate to a moving object when the value calculated through the SVM weight operation is equal to or more than a preset threshold value; and
a moving object collision possibility decision module configured to determine whether the moving object is located in the preset dangerous zone, and output the collision risk signal, and
wherein the moving object collision possibility decision module recognizes a contour point of the large vehicle and a bottom point of the contour line of the moving object, calculates a longitudinal distance between the rear or front camera module and the moving object on the road based on Equation 2 below, calculates a horizontal distance between the large vehicle and the moving object on the road based on Equation 4 below, and outputs the collision risk signal when the longitudinal distance falls between a predefined minimum dangerous distance and maximum dangerous distance in the longitudinal direction while the horizontal distance is less than a predefined horizontal dangerous distance, $$Z = \frac{fh}{y} \quad \text{(Equation 2)}$$

$$W = \frac{fw}{y} \quad \text{(Equation 4)}$$

wherein Z represents the longitudinal distance between the rear or front camera module and the moving object on the road, f represents the focal distance of the rear or front camera module, h represents the height of the rear or front camera module from the ground surface, y represents a distance between a vanishing point and the bottom point of the contour line of the moving object on a viewport imaged by the rear or front camera module, W represents the horizontal distance between the large vehicle and the moving object on the road, and w represents a horizontal distance between the contour point of the large vehicle and the bottom point of the contour line of the moving object on the viewport imaged by the rear or front camera module.

13. A side safety assistant method for a large vehicle, that monitors a dangerous zone at a side of the large vehicle using a rear camera module which is mounted at the rear of at least one side surface of the large vehicle and configured to image an object while facing the front of the large vehicle and a front camera module which is mounted at the front of at least one side surface of the large vehicle so as to face the rear camera module and configured to image an object while facing the rear of the large vehicle, the side safety assistant method comprising the steps of:

(a) receiving an image from the rear camera module and the front camera module;

(b) extracting an object included in the image received at the step (a);

(c) determining whether the object extracted at the step (b) is a moving object including a bicycle, two-wheeled vehicle and pedestrian;

(d) determining whether the moving object determined at the step (c) is located within a preset dangerous zone, and outputting a collision risk signal; and (e) outputting a visual or auditory warning signal in response to the collision risk signal, wherein the step (d) comprises recognizing a bottom point of the contour line of the moving object, calculating a longitudinal distance between the rear or front camera module and the moving object on the road based on Equation 2 below, and outputting the collision risk signal when the longitudinal distance falls between a predefined minimum dangerous distance and maximum dangerous distance in the longitudinal direction, $$Z = \frac{fh}{y} \quad \text{(Equation 2)}$$

where Z represents the longitudinal distance between the rear or front camera module and the moving object on the road, f represents the focal distance of the rear or front camera module, h represents the height of the rear or front camera module from the ground surface, and y represents a distance between a vanishing point and the bottom point of the contour line of the moving object on a viewport imaged by the rear or front camera module.

14. The side safety assistant method of claim 13, wherein the step (d) comprises the steps of:

(d-1) outputting a first collision risk signal when the moving object is located within the dangerous zone;

(d-2) outputting a second collision risk signal when a change in steering angle of the steering wheel in the large vehicle is sensed while the condition of the step (d-1) is satisfied.

15. The side safety assistant method of claim 14, wherein the step (e) comprises outputting a visual warning signal in response to the first collision risk signal, and outputting an auditory warning signal in response to the second collision risk signal.

16. The side safety assistant method of claim 14, further comprising the step of emergently braking the large vehicle in response to the second collision risk signal, after the step (e).

17. The side safety assistant method of claim 13, wherein the step (c) comprises:
(c-1) extracting one or more objects from the image;
(c-2) detecting an edge of the extracted object, and detecting an object having a predetermined size or more of area distinguished by the edge as a moving object candidate;
(c-3) detecting a motion of the moving object candidate by comparing a current frame of the image taken by each of the rear and front camera modules to a previous frame before the current frame, and determining that the moving object candidate is moving, when the motion is detected; and
(c-4) performing a HOG operation on the moving object candidate when the determination result of the step (c-3) indicates that the moving object candidate is moving, performing a SVM weight operation on the HOG operation result, and setting the moving object candidate to a moving object when the value calculated through the SVM weight operation is equal to or more than a preset threshold value.

18. The side safety assistant method of claim 17, wherein the step (c-2) comprises detecting a vertical component of the edge of the object, and determining a similarity between the vertical component and a predefined pattern of the moving object, in order to detect the moving object candidate.

19. The side safety assistant method of claim 17, wherein the step (c-3) comprises dividing the current frame and the previous frame into a predetermined size of blocks, calculating the sums of pixel value differences between blocks including the moving object candidate in the current frame and blocks including the moving object candidate in the previous frame based on Equation 1 below, setting the block having the smallest sum of pixel value differences to a corresponding block of the previous frame, and determining that the moving object candidate is moving when the location of the corresponding block is changed, $$SAD = \sum_{i=1}^{N} \sum_{j=1}^{M} |(I_{ij}(k) - I_{ij}(k-1))| \quad \text{(Equation 1)}$$

where $I_{ij}(k)$ represents the pixel value of an i-th row and j-th column of a block in a k-th image frame, and $I_{ij}(k-1)$ represents the pixel value of an i-th row and j-th column of a block in the immediately previous image frame of the k-th image frame.

20. A side safety assistant method for a large vehicle, that monitors a dangerous zone at a side of the large vehicle using a rear camera module which is mounted at the rear of at least one side surface of the large vehicle and configured to image an object while facing the front of the large vehicle and a front camera module which is mounted at the front of at least one side surface of the large vehicle so as to face the rear camera module and configured to image an object while facing the rear of the large vehicle, the side safety assistant method comprising the steps of:
(a) receiving an image from the rear camera module and the front camera module;
(b) extracting an object included in the image received at the step (a);
(c) determining whether the object extracted at the step (b) is a moving object including a bicycle, two-wheeled vehicle and pedestrian;
(d) determining whether the moving object determined at the step (c) is located within a preset dangerous zone, and outputting a collision risk signal; and
(e) outputting a visual or auditory warning signal in response to the collision risk signal,
wherein the step (d) comprises recognizing a contour point of the large vehicle and a bottom point of the contour line of the moving object, calculating a horizontal distance between the large vehicle and the moving object on the road based on Equation 4 below, and outputting the collision risk signal when the horizontal distance is less than a predefined horizontal dangerous distance, $$W = \frac{fw}{y} \quad \text{(Equation 4)}$$

where W represents the horizontal distance between the large vehicle and the moving object on the road, f represents the focal distance of the rear or front camera module, w represents a horizontal distance between the contour point of the large vehicle and the bottom point of the contour line of the moving object on a viewport imaged by the rear or front camera module, and y represents a distance between a vanishing point and the bottom point of the contour line of the moving object on the viewport imaged by the rear or front camera module.

21. A side safety assistant method for a large vehicle, that monitors a dangerous zone at a side of the large vehicle using a rear camera module which is mounted at the rear of at least one side surface of the large vehicle and configured to image an object while facing the front of the large vehicle and a front camera module which is mounted at the front of at least one side surface of the large vehicle so as to face the rear camera module and configured to image an object while facing the rear of the large vehicle, the side safety assistant method comprising the steps of:
(a) receiving an image from the rear camera module and the front camera module;
(b) extracting an object included in the image received at the step (a);
(c) determining whether the object extracted at the step (b) is a moving object including a bicycle, two-wheeled vehicle and pedestrian;
(d) determining whether the moving object determined at the step (c) is located within a preset dangerous zone, and outputting a collision risk signal; and
(e) outputting a visual or auditory warning signal in response to the collision risk signal,
wherein the step (d) comprises recognizing a contour point of the large vehicle and a bottom point of the contour line of the moving object, calculating a longitudinal distance between the rear or front camera module and the moving object on the road based on Equation 2 below, calculating a horizontal distance between the large vehicle and the moving object on the road based on Equation 4 below, and outputting the collision risk signal when the longitudinal distance falls between a predefined minimum dangerous distance and maximum dangerous distance in the longitudinal direction while the horizontal distance is less than a predefined horizontal dangerous distance, $$Z = \frac{fh}{y} \quad \text{(Equation 2)}$$

$$W = \frac{fw}{y} \quad \text{(Equation 4)}$$

wherein Z represents the longitudinal distance between the rear or front camera module and the moving object on the road, f represents the focal distance of the rear or front camera module, h represents the height of the rear or front camera module from the ground surface, y represents a distance between a vanishing point and the bottom point of the contour line of the moving object on a viewport imaged by the rear or front camera module, W represents the horizontal distance between the large vehicle and the moving object on the road, and w represents a horizontal distance between the contour point of the large vehicle and the bottom point of the contour line of the moving object on the viewport imaged by the rear or front camera module.

\* \* \* \* \*